United States Patent [19]
Wieszt et al.

[11] Patent Number: 5,857,536
[45] Date of Patent: Jan. 12, 1999

[54] SUN SENSING ARRANGEMENT AND METHOD OF ARRANGING A SUN SENSOR IN A MOTOR VEHICLE

[75] Inventors: Herbert Wieszt, Grafenau; Wolfgang Straub, Deggingen, both of Germany

[73] Assignee: Mercedes-Benz AG, Stuttgart, Germany

[21] Appl. No.: 755,204

[22] Filed: Nov. 22, 1996

[30]  Foreign Application Priority Data

Nov. 22, 1995 [DE] Germany ................... 195 43 512.5

[51] Int. Cl.⁶ ........................................... B62D 25/10
[52] U.S. Cl. ............................................... 180/69.2
[58] Field of Search ........................ 180/69.2, 69.21, 180/68.1, 68.2, 69.24; 296/180.3, 180.2, 180.1

[56]  References Cited

U.S. PATENT DOCUMENTS

| | | |
|---|---|---|
| 4,850,444 | 7/1989 | Bajanowski et al. ............. 180/69.2 |
| 4,917,293 | 4/1990 | Fedter . |
| 5,186,682 | 2/1993 | Iida . |
| 5,275,249 | 1/1994 | Helson ............................ 180/69.2 |

FOREIGN PATENT DOCUMENTS

| | | |
|---|---|---|
| 38 21 743 | 1/1990 | Germany . |
| 1-22630 | 2/1989 | Japan . |
| 1-147112 | 10/1989 | Japan . |

*Primary Examiner*—Richard M. Camby
*Attorney, Agent, or Firm*—Evenson, McKeown, Edwards & Lenahan, P.L.L.C.

[57]  ABSTRACT

A sun sensing arrangement for a motor vehicle, and a method of arranging a sun sensor in a motor vehicle, in order to sense incident sunlight. The motor vehicle has an engine hood which includes a top-side air inlet grid area. The sun sensor is arranged inside the air inlet grid area of the engine hood. This positioning permits sunlight to be sensed in a large solid-angle range which is not influenced by the vehicle windows or objects mounted on the roof of the vehicle, and the styling of the vehicle body shell is not noticeably influenced.

16 Claims, 1 Drawing Sheet

SUN SENSING ARRANGEMENT AND METHOD OF ARRANGING A SUN SENSOR IN A MOTOR VEHICLE

BACKGROUND AND SUMMARY OF THE INVENTION

This invention relates to a sun sensing arrangement for a motor vehicle including a sensor for detecting incident sunlight and the motor vehicle having an engine hood which has a top-side air inlet grid area. This invention also relates to a method of arranging a sun sensor in a motor vehicle.

It is generally known to arrange one or several sun sensors in a motor vehicle which sense sunlight radiated onto the motor vehicle with respect to its intensity and optionally also with respect to its radiation direction and which supply the information obtained from this or these sensor(s) as an analog or digital signal to an interior-temperature control device so that the control device will be capable of controlling the temperature of the interior of the motor vehicle as a function of the sun radiation.

It is understood that the sun sensor, which usually contains one or several light-sensitive diodes or resistance elements, must be arranged on a surface of the vehicle which is accessible to the incident sunlight, that is, is exposed to the light radiation in the upward direction. U.S. Pat. No. 4,917,293 shows a radiation sensor which is exposed in the upward direction. Specifically, it is known in this respect, for example, from German Published Patent Document DE 38 21 743 A1 and U.S. Pat. No. 5,186,682, to mount the sun sensor or sensors on the dashboard in the vehicle interior where they do not interfere with the styling of the shell of the vehicle body and are protected from environmental influences. However, in the case of this mounting site, the effective sensing angle range is generally limited by shading as a result of light-impermeable A-column areas and of the forward roof area. In addition, the light reaching the sun sensor must pass through one of the vehicle windows. Depending on the type of window pane and any tinting applied thereto, different reflection and absorption effects may occur which influence the measuring result of the sun sensor.

An object of the present invention is to provide a motor vehicle with a sun sensor which has a relatively large sensing angle range, is exposed to only relatively low external interferences, does not noticeably impair the vehicle styling, and permits a sensing of the sunlight which is not influenced by the vehicle windows or vehicle body columns.

This and other objects have been achieved according to the present invention by providing a sun sensing arrangement for a motor vehicle, comprising: an engine hood having a top-side air inlet grid area; and at least one sun sensor for sensing incident sunlight arranged within the air inlet grid area of the engine hood.

This and other objects have also been achieved according to the present invention by providing a method of arranging a sun sensor in a motor vehicle including an engine hood having a top-side air inlet grid area, the method comprising the step of arranging at least one sun sensor for sensing incident sunlight within the air inlet grid area of the engine hood.

According to the present invention, the sun sensor is arranged inside the air inlet grid area of the engine hood. This permits an almost hemispherical sensing angle range with only slight shading. The sensor signal remains independent of the types of glass and/or tinting in each case used for the different vehicle windows and therefore always is a reliable measurement for the actual sun radiation onto the vehicle. The installation of the sun sensor in the air inlet grid of the vehicle hood can take place in a stylistically inconspicuous manner, and the visual appearance of the roof of the vehicle remains unchanged. In addition, in the case of this mounting site, there is no danger of a shading of the sensor as a result of accessories, such as ski racks, bicycle racks, etc. mounted on the outside of the vehicle.

These and other objects, features and advantages of the present invention will become more readily apparent from the following detailed description when taken in conjunction with the accompanying drawings.

BRIEF DESCRIPTION OF THE DRAWING

The single figure is a schematic top view of the forward half of a motor vehicle equipped with a sun sensor according to a preferred embodiment of the present invention.

DETAILED DESCRIPTION OF THE DRAWING

Figure 1:
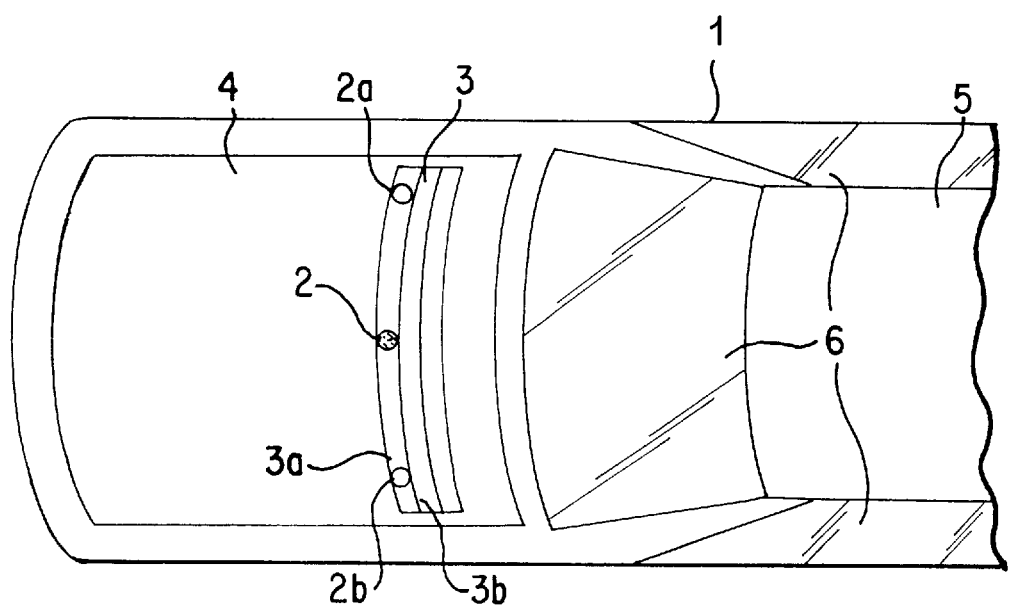

The illustrated motor vehicle 1 is equipped with a sun sensor 2 which is of one of the conventional constructions and which will not be discussed here in detail. The sun sensor 2 contains one or several light-sensitive diodes or resistance elements which sense the sunlight with respect to its intensity and, optionally if desired, also with respect to the radiation direction. In a manner which is not shown, the sun sensor is coupled by way of a data-bus-communicable output to a data bus system of the motor vehicle 1, which provides the sensor output signal to vehicle components coupled to the data bus system. In particular, an air-conditioning system of the motor vehicle accesses this sensor information transmitted by way of the data bus and controls the temperature in the passenger compartment of the motor vehicle 1 as a function of this sensor output signal, i.e., as a function of the momentarily radiated sunlight intensity and optionally also the sunlight direction detected by the sun sensor 2.

The sun sensor 2 is arranged in the longitudinal center of the vehicle in the air inlet grid area 3 which is open in the upward direction and which extends transversely within the rearward half of an engine hood 4. The air inlet grid area 3 comprises a plurality of grid webs. In a preferred embodiment, the sun sensor 2 is arranged in the forward part of the air inlet grid area, and in particular is arranged in front of a forwardmost grid web 3b. In a known manner, the air inlet grid area 3 is used for the air intake by the ventilation and air-conditioning system. In the illustrated embodiment, the sun sensor 2 is arranged within the most forward air inlet slot 3a in such a manner that, on the top side, it ends essentially flush with the area of the engine hood 4 adjoining toward the front and essentially flush with a top portion of the forwardmost grid web 3b of the air inlet grid area 3 adjoining toward the rear or, in any case, projects only slightly toward the top beyond it. As a result of this positioning, the sun sensor 2 has an almost hemispherical sensing range with an only slight shading without noticeably impairing the styling of the shell of the vehicle body. In particular, the sun sensor does not detract from the styling of the vehicle roof 5. In addition, in the case of this mounting site of the sun sensor 2, there is no shading by rack parts mounted on the roof, such as ski racks, bicycle racks, etc. The mounting of the sun sensor 2 outside the vehicle interior also avoids the dependence of the sun sensor signal on the respective type of panes and/or tinting used for the windows 6 of the motor vehicle 1. On the contrary, the sun sensor 2 senses the incident sunlight without any previous filtering by the windows 6.

It is understood that, according to the application, two or more sun sensors can also be arranged anywhere within the air inlet grid area 3, for example, for improving the direction selectivity of the radiation sensing. Particularly two sun sensors 2a, 2b may be arranged symmetrically with respect to the longitudinal center of the motor vehicle on each vehicle side and optionally another sun sensor 2 can be arranged in the longitudinal vehicle center.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A sun sensing arrangement for a motor vehicle, comprising:
   an engine hood having a top-side air inlet grid area; and
   at least one sun sensor for sensing incident sunlight arranged within the air inlet grid area of the engine hood, wherein the sun sensor outputs a signal corresponding to at least one of an intensity and a radiation direction of the sunlight for controlling the temperature of an interior passenger compartment of the motor vehicle.

2. A sun sensing arrangement for a motor vehicle according to claim 1, wherein said air inlet grid area comprises a plurality of grid webs extending transversely with respect to said motor vehicle, said plurality of grid webs including a forwardmost grid web, and wherein said at least one sun sensor is arranged in the air inlet grid area adjacent to and in front of said forwardmost grid web.

3. A sun sensing arrangement for a motor vehicle according to claim 1, wherein said at least one sun sensor is arranged in the air inlet grid area such that a top side of the at least one sun sensor is essentially flush with an area of the engine hood adjacent the at least one sun sensor.

4. A sun sensing arrangement for a motor vehicle according to claim 2, wherein said at least one sun sensor is arranged in the air inlet grid area such that a top side of the at least one sun sensor is essentially flush with a top portion of the forwardmost grid web.

5. A sun sensing arrangement for a motor vehicle according to claim 1, wherein two sun sensors are arranged in the air inlet grid area symmetrically with respect to a longitudinal center of the motor vehicle.

6. A sun sensing arrangement for a motor vehicle according to claim 4, wherein two sun sensors are arranged in the air inlet grid area symmetrically with respect to a longitudinal center of the motor vehicle.

7. A sun sensing arrangement for a motor vehicle according to claim 5, further comprising another sun sensor arranged in the air inlet grid area in a longitudinal center of the motor vehicle.

8. A method of arranging a sun sensor in a motor vehicle including an engine hood having a top-side air inlet grid area, said method comprising the step of arranging at least one sun sensor for sensing incident sunlight within the air inlet grid area of the engine hood, wherein the sun sensor outputs a signal corresponding to at least one of an intensity and a radiation direction of the sunlight for controlling the temperature of an interior passenger compartment of the motor vehicle.

9. A method of arranging a sun sensor in a motor vehicle according to claim 8, wherein said air inlet grid area comprises a plurality of grid webs extending transversely with respect to said motor vehicle, said plurality of grid webs including a forwardmost grid web, and further comprising the step of arranging said at least one sun sensor in the air inlet grid area adjacent to and in front of said forwardmost grid web.

10. A method of arranging a sun sensor in a motor vehicle according to claim 8, further comprising the step of arranging said at least one sun sensor in the air inlet grid area such that a top side of the at least one sun sensor is essentially flush with an area of the engine hood adjacent the at least one sun sensor.

11. A method of arranging a sun sensor in a motor vehicle according to claim 9, further comprising the step of arranging said at least one sun sensor in the air inlet grid area such that a top side of the at least one sun sensor is essentially flush with a top portion of the forwardmost grid web.

12. A method of arranging a sun sensor in a motor vehicle according to claim 8, wherein two sun sensors are arranged in the air inlet grid area, and further comprising the step of arranging said two sun sensors symmetrically with respect to a longitudinal center of the motor vehicle.

13. A method of arranging a sun sensor in a motor vehicle according to claim 11, wherein two sun sensors are arranged in the air inlet grid area, and further comprising the step of arranging said two sun sensors symmetrically with respect to a longitudinal center of the motor vehicle.

14. A method of arranging a sun sensor in a motor vehicle according to claim 12, further comprising the step of arranging another sun sensor in the air inlet grid area in a longitudinal center of the motor vehicle.

15. An arrangement according to claim 1, wherein the sun sensor is directly exposed to said incident sunlight.

16. A method according to claim 8, wherein the sun sensor is directly exposed to said incident sunlight.

* * * * *